United States Patent
Li

(10) Patent No.: US 11,063,550 B2
(45) Date of Patent: Jul. 13, 2021

(54) ACTIVE HARMONIC FILTER AND REGENERATING ENERGY CONTROL APPARATUS AND METHOD OF OPERATION

(71) Applicant: Eaton Intelligent Power Limited, Dublin (IE)

(72) Inventor: Huaqiang Li, Menomonee Falls, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/437,043

(22) Filed: Jun. 11, 2019

(65) Prior Publication Data

US 2020/0044596 A1 Feb. 6, 2020

Related U.S. Application Data

(60) Provisional application No. 62/713,050, filed on Aug. 1, 2018.

(51) Int. Cl.
| | |
|---|---|
| H02P 27/08 | (2006.01) |
| H02P 29/50 | (2016.01) |
| H02M 1/44 | (2007.01) |
| H02M 7/5387 | (2007.01) |
| H02M 1/12 | (2006.01) |

(52) U.S. Cl.
CPC .............. *H02P 29/50* (2016.02); *H02M 1/12* (2013.01); *H02M 1/44* (2013.01); *H02M 7/53871* (2013.01); *H02P 27/08* (2013.01)

(58) Field of Classification Search
CPC ........ H02P 1/26; H02P 1/265; H02P 2201/15; H02P 27/06
See application file for complete search history.

(56) References Cited

U.S. PATENT DOCUMENTS

| | | | |
|---|---|---|---|
| 8,098,031 B2 * | 1/2012 | Chang ................... | H02M 7/797 318/376 |
| 8,217,617 B2 * | 7/2012 | Jahkonen .............. | H02J 7/0047 318/722 |
| 8,737,097 B1 * | 5/2014 | Swamy ................ | H02M 5/458 363/67 |
| 9,667,177 B1 * | 5/2017 | Li .......................... | H02P 1/265 |

(Continued)

OTHER PUBLICATIONS

Active Harmonic Filtering Solutions Catalogue, Schneider Electric, 2009, pp. 1-20.

(Continued)

*Primary Examiner* — Rina I Duda
(74) *Attorney, Agent, or Firm* — DiBerardino McGovern IP Group LLC

(57) ABSTRACT

An active harmonic filter (AHF) and regenerating energy control (REC) apparatus for an adjustable speed drive (ASD) includes an inverter and a controller operatively coupled to the inverter to selectively control operation thereof. The controller is programmed to operate the inverter in different modes in order to manage different conditions that occur during operation of the ASD. In an AHF mode, the controller operates the inverter to filter harmonics present at an input to an ASD. In an REC mode, the controller operates the inverter to control regenerating energy flowing into the inverter from the ASD.

20 Claims, 5 Drawing Sheets

(56) References Cited

U.S. PATENT DOCUMENTS

2017/0170743 A1* 6/2017 Medagam ........... H02M 1/4233

OTHER PUBLICATIONS

"Modern Active Filters and Traditional Passive Filters," Department of Electrical and Electronic Engineering, Tokyo Institute of Technology, Bulletin of the Polish Academy of Sciences, Technical Sciences, vol. 54, No. 3, 2006, pp. 255-269.
Regenerative Braking Unit R1000, Yaskawa America, Inc., Drives & Motion Division, Sep. 1, 2015, pp. 1-2.

* cited by examiner

ACTIVE HARMONIC FILTER AND REGENERATING ENERGY CONTROL APPARATUS AND METHOD OF OPERATION

CROSS REFERENCE TO RELATED APPLICATION

The present invention claims priority to U.S. Provisional Patent Application Ser. No. 62/713,050 filed Aug. 1, 2018, the disclosure of which is incorporated herein by reference in its entirety.

BACKGROUND OF THE INVENTION

The present invention relates generally to circuits for filtering harmonics and controlling regenerating energy and, more particularly, to an active harmonic filter (AHF) and regenerating energy control (REC) apparatus for use with an adjustable speed drive (ASD) and method of operation thereof.

One type of system commonly used to perform power conversion is an adjustable speed drive (ASD—also known as a variable frequency drive (VFD)). An ASD is an industrial control device that provides for adjustable frequency, adjustable voltage operation of a driven system such as, for example, an alternating current (AC) induction motor. An ASD typically receives an AC power input, converts the AC power input into a direct current (DC) power using a rectifier, and inverts the DC power into an AC power output with a desired voltage and frequency for controlling the motor using an inverter. This variable operation of ASDs enables precise control of AC motor speed and torque. However, ASDs introduce harmonics into the system in which they are implemented because ASDs are nonlinear loads.

A nonlinear load introduces harmonics into a system because the waveform of the current that the nonlinear load draws does not match the sinusoidal waveform of the source voltage. ASDs are nonlinear loads because they include rectifiers that do not necessarily draw a sinusoidal current and, in some cases, create a total harmonic distortion (THD) on the input current of greater than 30%. Harmonic currents flowing through system impedances create voltage harmonics that distort the source voltage. Harmonic currents can also increase the RMS current, introduce stress on the electrical network, and potentially damage equipment. As a result, harmonics may disrupt the normal operation of devices and increase operating costs in any given system.

Harmonics are generally managed using different types of harmonic filters. Passive harmonic filters include capacitors, inductors, and/or resistors that provide low-impedance paths for specific harmonic frequencies in order to absorb the dominant harmonic currents in a system. Active harmonic filters include converters that are typically controlled using pulse width modulation. Active harmonic filters actively monitor and control the harmonic filtering with their converters. However, in either case, the harmonic filter is often constructed as a separate drive from the ASD with which it is implemented, particularly when the harmonic filter must be retrofitted to an already existing ASD.

Another problem associated with ASDs is the production of regenerating energy, which is energy that returns to an ASD inverter from a motor the inverter is operating. A motor will produce regenerating energy as it decelerates and if the load controlled by the motor starts to pull a motor faster than its synchronous speed, which causes the motor to act as a generator. For example, when an elevator travels downward, its motor slows its descent, producing negative torque and, therefore, regenerating energy. Regenerating energy is controlled using two different methods. A dynamic braking method directs the regenerating energy to a braking resistor unit that dissipates the regenerating energy as heat. A more preferred regenerative braking method directs the regenerating energy back to the motor's power source or to an energy storage system. Either method is commonly executed by a drive retrofitted to an existing ASD.

While the above methods of filtering harmonics and controlling regenerating energy provide adequate solutions, these solutions are separate from each other. Thus, in order to filter harmonics and control regenerating energy in an existing ASD, both a harmonic filter drive and a regenerating energy drive need to be installed with the ASD. These two independent drives greatly increase the cost of using the ASD and require additional space for their hardware. Thus, the addition of the two drives imposes a significant economic and design hardship in implementing an ASD that is able to operate with harmonic interference and when its load is producing regenerating energy.

It would therefore be desirable to design a more compact and cost-effective solution for filtering harmonics and controlling regenerating energy in an ASD.

BRIEF DESCRIPTION

Embodiments of the present invention provide a single apparatus for actively filtering harmonics in and controlling regenerating energy output by an ASD. The circuit may be implemented with existing ASDs as a retrofit drive.

In accordance with one aspect of the invention, an AHF and REC apparatus for an ASD includes an inverter and a control system operatively coupled to the inverter to selectively control operation thereof. The control system is programmed to operate the inverter in an AHF mode in order to filter harmonics present at an input to an ASD and operate the inverter in an REC mode in order to control regenerating energy flowing into the inverter from the ASD.

In accordance with another aspect of the invention, a method of operating an AHF and REC apparatus couplable to an ASD and having a controller is performed by the controller. The method includes monitoring harmonics at an input to the ASD, operating the AHF and REC apparatus in an AHF mode to filter the harmonics, determining that regenerating energy is flowing from the ASD into the AHF and REC apparatus, and switching operation of the AHF and REC apparatus from the AHF mode to an REC mode to manage the regenerating energy.

In accordance with yet another aspect of the invention, a retrofit drive with AHF and REC for an ASD includes a drive input/output capable of receiving a power input and discharging a power output and a filter reactor having one or more inductors coupled to the drive input/output. The retrofit drive also includes an inverter having an AC side coupled to the drive input/output via the reactor and a DC side. The retrofit drive additionally includes a capacitor bank having one or more capacitors coupled to the DC side of the inverter and a diode having a cathode coupled to the capacitor bank and an anode. The retrofit drive further includes a drive input coupled to the anode of the diode and capable of receiving regenerating energy. In addition, the retrofit drive includes a controller configured to operate the inverter in an AHF mode to filter harmonics present at an input to the ASD, operate the inverter in an REC mode to regulate regenerating energy flowing into the drive input and into the anode of the diode, and deactivate the inverter if the drive input is not receiving regenerating energy and a characteristic of the harmonics present at the drive input/output is below a preset threshold.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to an AHF and REC apparatus or drive and method of operation thereof for filtering harmonics present in a power input to an ASD and also controlling regenerating energy output from the ASD. The AHF and REC apparatus includes an inverter and a controller configured to operate the inverter in an AHF mode and an REC mode. The controller operates the inverter in AHF mode to filter harmonics at the ASD input. If the ASD begins outputting regenerating energy to the AHF and REC circuit, the control system operates the inverter in REC mode to direct the output back to the power input.

Figure 1:
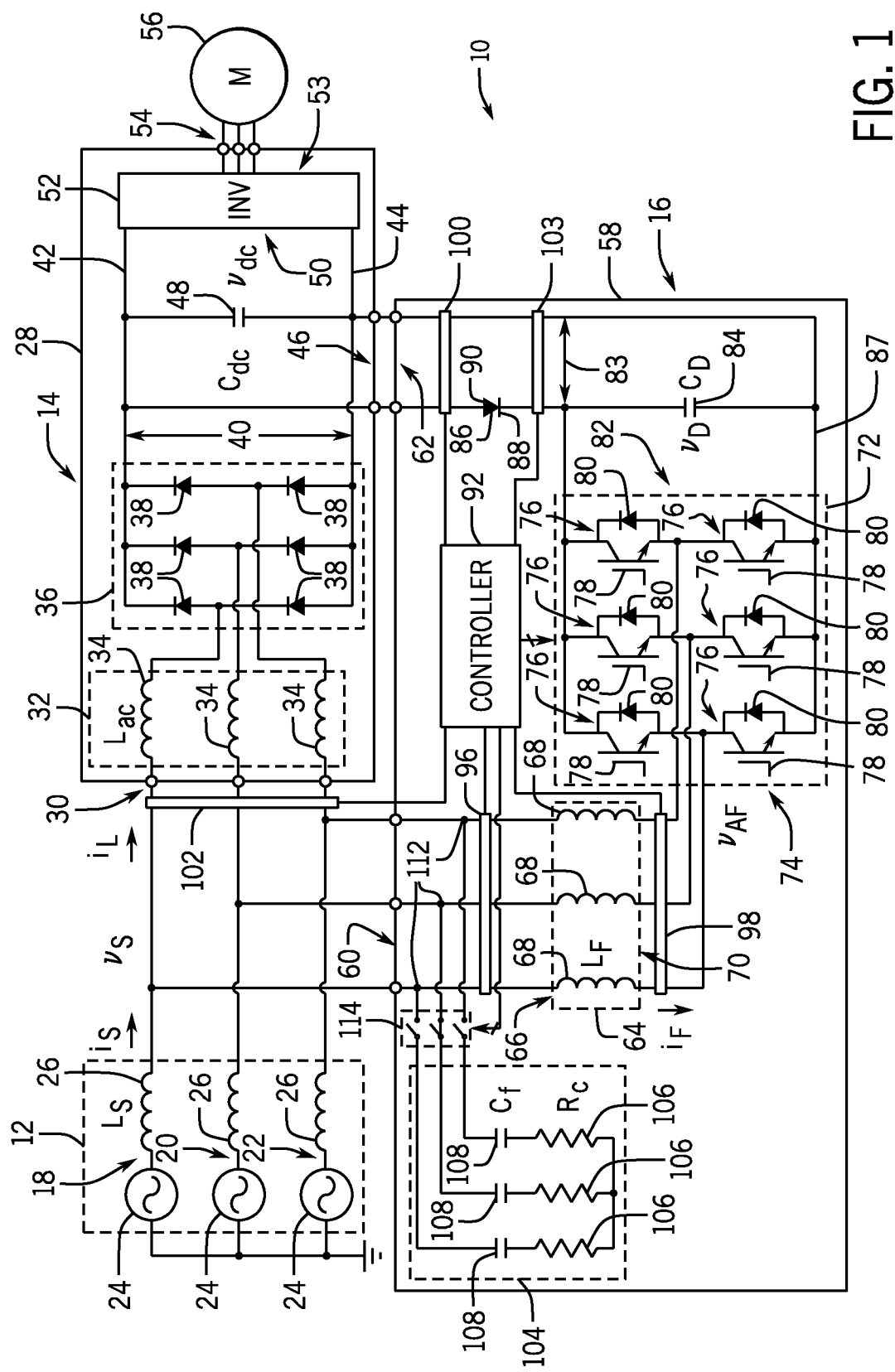
FIG. 1 is a schematic diagram of an electrical system including an AHF and REC apparatus coupled to an ASD, according to an embodiment of the invention.

Referring now to FIG. 1, an electrical system 10 is shown, according to an embodiment of the invention. Electrical system 10 includes a power source 12, an ASD 14, and an AHF and REC apparatus or drive 16. Power source 12 is a three-phase power source. Each phase 18, 20, 22 of power source 12 is represented by an AC source 24 and a source inductor 26 having an inductance, $L_S$. In some embodiments, power source 12 is a utility grid. However, power source 12 may be in the form of another type of power source such as, for example, an energy storage device or generator. Power source 12 outputs an AC power including a source voltage, $v_S$, and a source current, $i_S$, to ASD 14.

ASD 14 includes a housing 28 having an ASD input 30 coupled to each phase 18, 20, 22 of power source 12 and receiving a line current, $i_L$. Within housing 28, ASD input 30 is coupled to an AC line reactor 32. Line reactor 32 is shown as three inductors 34, each of which has a line inductance, $L_{ac}$, and is coupled to one of phases 18, 20, 22 of power source 12. In some embodiments, each inductor 34 is an inductor bank having more than one inductor and a total line inductance, $L_{ac}$. ASD 14 also includes a three-phase rectifier bridge 36 coupled to line reactor 32. Rectifier 36 includes an arrangement of six diodes 38 that function to convert an AC power from line reactor 32 into a DC power. The DC power from rectifier 36 is received by a DC link 40 having a positive bus 42 and a negative bus 44 with a DC link voltage, $v_{dc}$, thereacross. DC link 40 is coupled to a regenerating energy output 46, a capacitor bank 48, and a DC side 50 of an ASD inverter 52. Capacitor bank 48 has a capacitance, $C_{dc}$, and may include one or more capacitors. In an exemplary embodiment, inverter 52 includes a series of insulated-gate bipolar transistor (IGBT) switches and anti-parallel diodes (not shown) collectively forming a pulse width modulation (PWM) inverter that is able to invert a DC power at DC side 50 into an AC power at an AC side 53 thereof and convert an AC power at AC side 53 into a DC power at DC side 50. AC side 53 of inverter 52 is coupled to an ASD input/output (I/O) 54 in housing 28.

In various embodiments, ASD 14 may not include line reactor 32 and instead include one or more DC chokes. As a non-limiting example, ASD 14 may include a first DC choke having an inductance, $L_{dc}$, on positive bus 42 of DC link 40 between rectifier 36 and capacitor bank 48 and a second DC choke having an inductance, $L_{dc}$, on negative bus 44 of DC link 40 between rectifier 36 and capacitor bank 48. As another non-limiting example, ASD 14 may include only one of the first DC choke on positive bus 42 and the second DC choke on negative bus 44. Furthermore, in some embodiments, ASD 14 may not include line reactor 32 or DC chokes.

When ASD 14 is operating under normal conditions, DC link 40 delivers the DC power thereon to capacitor bank 48 and to inverter 52, and inverter 52 delivers an AC power to ASD I/O 54 in housing 28. An AC motor 56 coupled to ASD I/O 54 receives the AC power and operates to power a load (not shown). When ASD 14 is operating under a regenerating condition, that is, when motor 56 is delivering an AC power back into ASD I/O 54, inverter 52 receives and converts the AC power into a DC power on DC link 40. Since rectifier 36 only operates to convert an AC power into a DC power and will not invert an AC power into a DC power, even during a regenerating energy condition, DC link 40 delivers the DC power received from inverter 50 to regenerating energy output 46, which is coupled to AHF and REC apparatus 16, as explained in more detail below.

AHF and REC apparatus 16 includes a housing 58 having an I/O 60 coupled to each phase 18, 20, 22 of power source 12 and a regenerating energy input 62 coupled to regenerating energy output 46 of ASD 14. I/O 60 is coupled to an AC filter reactor 64 at a first end 66 thereof. Filter reactor 64 is shown as three filter inductors 68, each of which has a filter inductance, $L_F$, and is coupled to one of phases 18, 20, 22 of power source 12. In other embodiments, each inductor 68 is an inductor bank including more than one inductor and having a total inductance, $L_F$. Filter inductance, $L_F$, may or may not be equal to line inductance, $L_{ac}$. Furthermore, in some embodiments, filter inductor 64 is positioned outside of housing 58, depending on the size requirements for filter inductor 64.

A second end 70 of filter reactor 64 is coupled to an AHF and REC inverter 72 at an AC side 74 thereof. A filter current, $i_F$, having a filter voltage, $v_{AF}$, associated therewith flows between second end 70 of filter reactor 64 and AC side 74 of inverter 72. Inverter 72 includes six pairs 76 of IGBT switches 78 and anti-parallel diodes 80 collectively forming a PWM inverter that is able to convert an AC power at AC side 74 into a DC power at a DC side 82 thereof and invert a DC power at DC side 82 into an AC power at AC side 74. DC side 82 of inverter 72 is coupled to a DC link 83 having a positive bus 85 and a negative bus 87 with a DC link voltage, $V_D$, thereacross. DC link 83 is coupled to a DC capacitor bank 84 and a diode 86. Capacitor bank 84 has a capacitance, CD, and may include one or more capacitors coupled to diode 86 and to REC input 62. Capacitor bank 84 can be considered an energy storage element. Diode 86 includes a cathode on a first end 88 thereof coupled to DC side 82 of inverter 72 and capacitor bank 84 and an anode on a second end 90 thereof coupled to regenerating energy input 62.

AHF and REC apparatus 16 further includes a control system or controller 92 configured or programmed to control inverter 72 and a plurality of sensors 96, 98, 100, 102, 103 that provide various measurements to controller 92. Sensors 96, 98, 100, 102, 103 include a supply voltage sensor 96, a filter current sensor 98, a first DC link voltage sensor 100, a line current sensor 102, and a second DC link voltage sensor 103, each of which measures or senses a different voltage or current. Supply voltage sensor 96 measures supply voltage, $v_S$, from power supply 12; filter current sensor 98 measures filter current, $i_F$, between filter reactor 64 and inverter 72; first DC link voltage sensor 100 measures DC link voltage, $v_{dc}$, of DC link 40 of ASD 14; line current sensor 102 measures line current, $i_L$, into ASD input 30; and second DC link voltage sensor 103 measures DC link voltage, $v_D$, of DC link 83 of AHF and REC apparatus 16. Each of supply voltage sensor 96, filter current sensor 98, first DC link voltage sensor 100, line current sensor 102, and second DC link voltage sensor 103 may include one or more sensors as necessary to measure their respective voltages and currents.

AHF and REC apparatus 16 also includes an optional electromagnetic interference (EMI) filter 104. EMI filter 104 may be included in AHF and REC apparatus 16 to reduce switching noise produced by inverter 52 of ASD 14 and/or inverter 72 of AHF and REC apparatus 16. EMI filter 104 is a passive RC filter having three parallel branches of a resistor bank 106 and a capacitor bank 108 in series and may be considered a first-order high-pass filter. However, in other embodiments, EMI filter 104 may have a different configuration. Each resistor bank 106 may include one or more resistors having a total resistance, $R_c$, and each capacitor bank 108 may include one or more capacitors having a total capacitance, $C_f$. Resistor banks 106 may be formed of compact resistors, and capacitor banks 108 are smaller than capacitor bank 48 of ASD 14 and capacitor bank 84. Resistor banks 106 may be considered damping resistors that decrease the quality factor, Q, in electrical system 10 in order to eliminate ringing.

EMI filter 104 may be selectively coupled to a node 112 between I/O 60 and first end 66 of filter reactor 68 via a set of relays 114 that are operable in a closed or ON state and an open or OFF state. In embodiments that include EMI filter 104, controller 92 is configured to control relays 114. Controller 92 may be configured or programmed to switch relays 114 from the OFF state to the ON state under a variety of conditions with an undesirable level of EMI such as, for example, when a switching frequency of inverter 52 of ASD 14 or inverter 72 of AHF and REC apparatus 16 is at or above a predetermined or preset switching frequency threshold. As a non-limiting example, controller 92 may operate relays 114 in the ON state when the switch frequency of inverter 52 or inverter 72 is at or above 10 kHz.

Controller 92 is configured to control inverter 72 in an ON state and an OFF state. Controller 92 may operate inverter 72 in the ON state using two different modes: an AHF mode and an REC mode. If neither AHF mode nor REC mode is needed, controller 92 maintains inverter 72 in the OFF state. When power source 12 is supplying power to ASD 14, controller 92 will operate inverter 72 in either AHF mode to filter harmonics in line current, $i_L$, or in the OFF state. If ASD 14 is outputting regenerating energy produced by motor 56, controller 92 will operate inverter 72 in REC mode to control the regenerating energy and direct it back to power source 12. Controller 92 may operate relays 114 in the ON state to connect EMI filter 104 to node 112 when operating inverter 72 in any of AHF mode, REC mode, and the OFF state.

Figure 2:
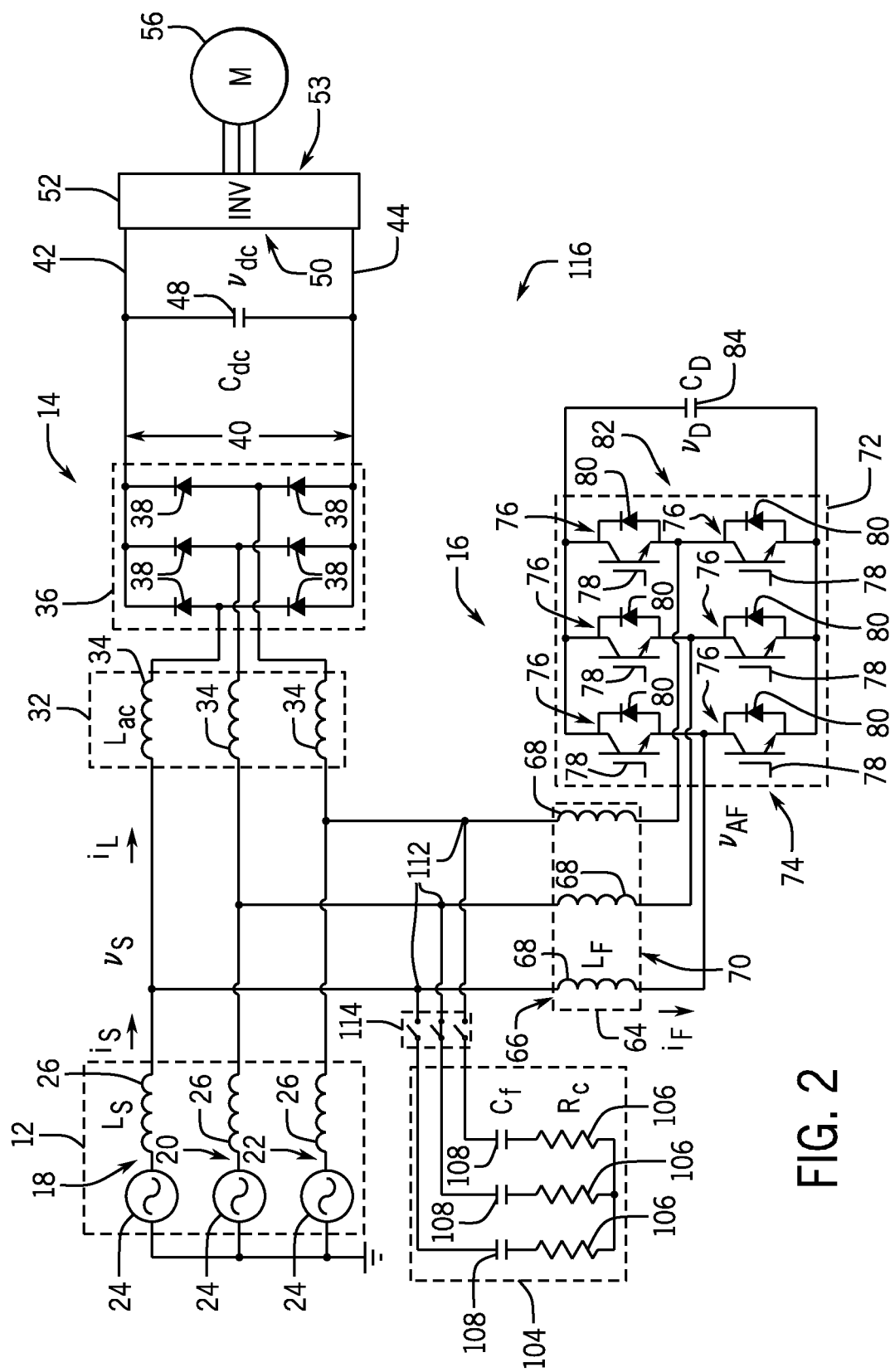
FIG. 2 is a schematic diagram of an equivalent circuit of the electrical system of FIG. 1 when an inverter of the AHF and REC apparatus is operating in an AHF mode, according to an embodiment of the invention.
Figure 3:
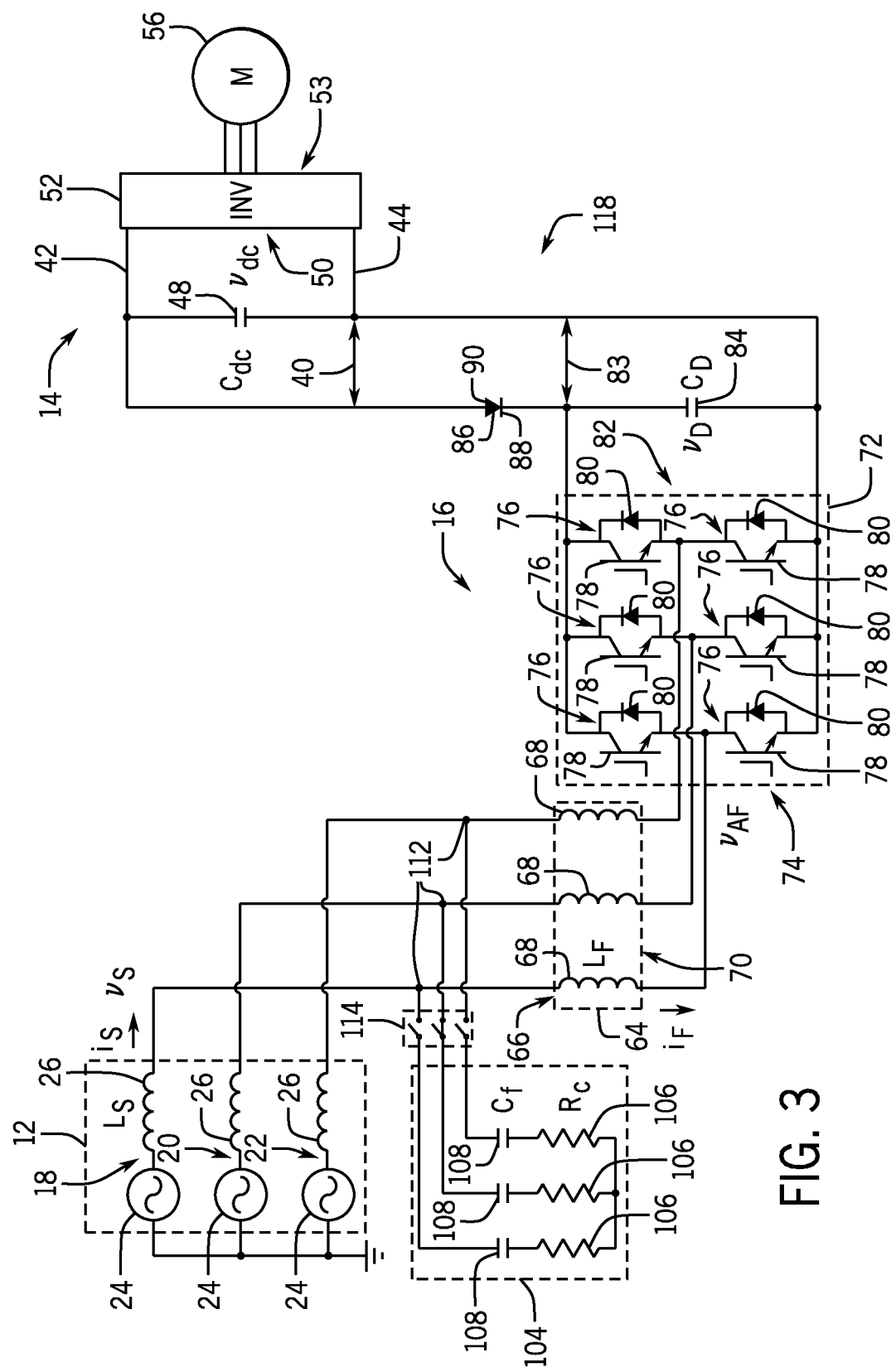
FIG. 3 is a schematic diagram of an equivalent circuit of the electrical system of FIG. 1 when the inverter of the AHF and REC apparatus is operating in an REC mode, according to an embodiment of the invention.
Figure 4:
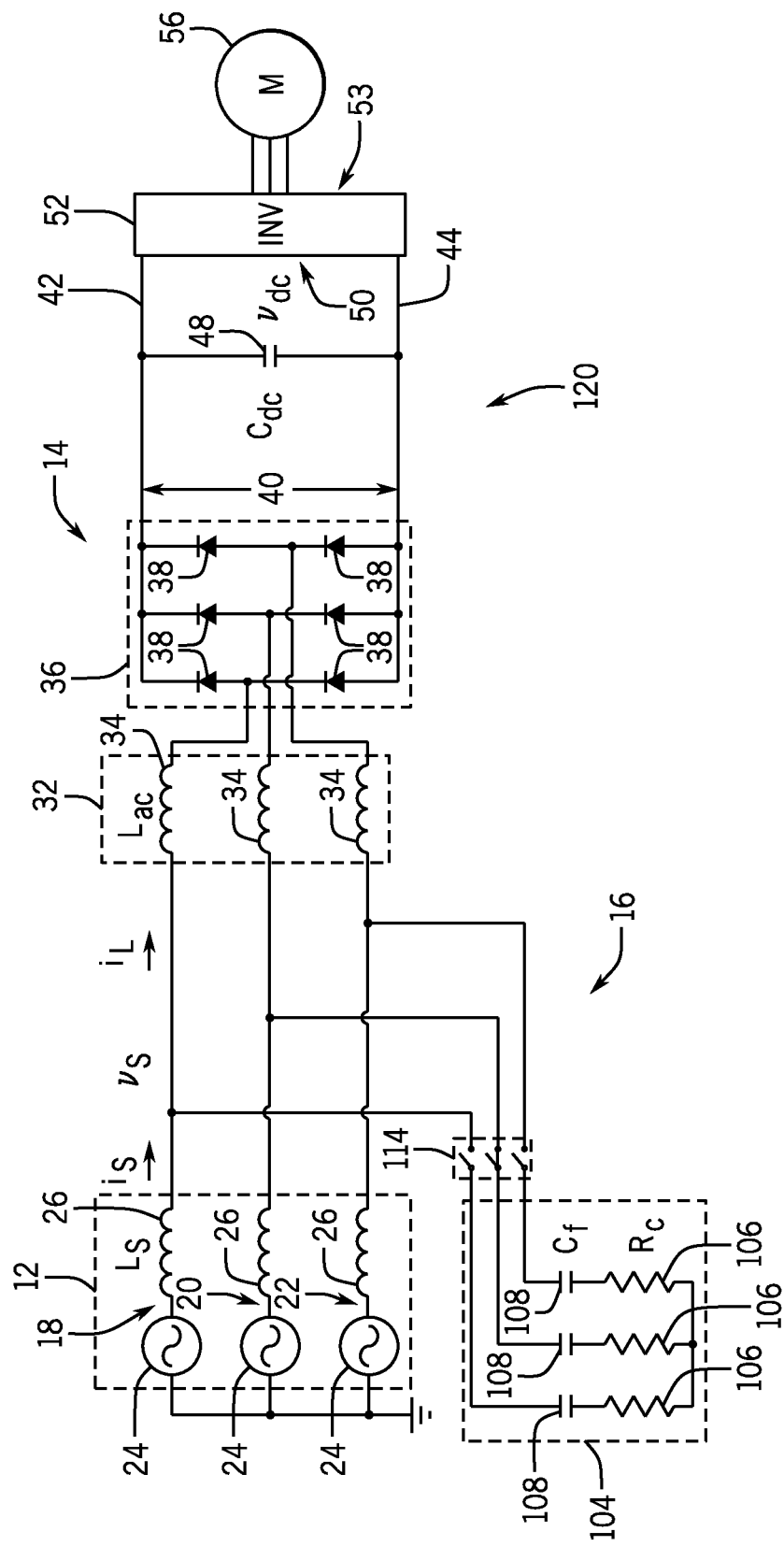
FIG. 4 is a schematic diagram of an equivalent circuit of the electrical system of FIG. 1 when the inverter of the AHF and REC apparatus is in an OFF state.

Referring now to FIGS. 2-4, and with reference back to FIG. 1, schematic diagrams of equivalent circuits 116, 118, 120 of electrical system 10 are shown, according to an embodiment of the invention. Equivalent circuit 116 of FIG. 2 illustrates electrical system 10 when controller 92 is operating inverter 72 in AHF mode. Equivalent circuit 118 of FIG. 3 illustrates electrical system 10 when controller 92 is operating inverter 72 in REC mode. Equivalent circuit 120 illustrates electrical system 10 when controller 92 is controlling inverter 72 in the OFF state. Housing 28 of ASD 14 and housing 58, controller 92, and sensors 96, 98, 100, 102, 103 of AHF and REC apparatus 16 are not shown in FIGS. 2-4 for purposes of clarity.

Referring to FIG. 2, power source 12 is supplying power to ASD 14 to drive motor 56 in equivalent circuit 116. Since motor 56 is not producing regenerating energy, ASD 14 is operating normally, and diode 86 (FIG. 1) of AHF and REC apparatus 16 is blocking current from flowing between DC link 40 of ASD 14 and DC link 83 of AHF and REC apparatus 16. This is equivalent to the absence of a connection between DC link 40 and DC link 83. Thus, diode 86 and the connection between DC link 40 and DC link 83 are not shown in equivalent circuit 116 of FIG. 2.

In order for diode 86 to block current flow between DC link 40 and DC link 83, DC link voltage, VD, on DC link 83 must be higher than DC link voltage, $v_{dc}$, on DC link 40. Controller 92 ensures that DC link voltage, $V_D$, is higher than DC link voltage, $v_{dc}$, when operating inverter 72 in AHF mode. Controller 92 senses DC link voltage, $V_D$, using second DC link voltage sensor 103 and regulates DC link voltage, $v_D$, to a preset AHF voltage. The AHF voltage is set to a value that will ensure the proper operation of AHF and REC apparatus 16 when controller 92 is operating inverter 72 in AHF mode.

Further, controller 92 is operating inverter 72 of AHF and REC circuit 16 in AHF mode because the THD at ASD input 30 of ASD 14 is above a predetermined or preset THD threshold such as 15%, 10%, 5%, or 3%, as non-limiting examples. The THD threshold is set according to the requirements for the application and/or location in which ASD 14 is being implemented, as different applications and countries may require a lower THD than others. In AHF mode, controller 92 operates inverter 72 to filter harmonics present in line current, $i_L$, at ASD input 30. Harmonics are created in line current, $i_L$, by rectifier 36 of ASD 14 because rectifier 36 does not draw a sinusoidal current to match the sinusoidal waveform of supply voltage, $v_S$, of power source 12. Thus, rectifier 36 distorts line current, $i_L$, and may create a THD of more than 30% at ASD input 30. This level of THD is not acceptable in many applications. As such, controller 92 is configured to reduce the level of THD down to a target value such as 15%, 10%, 5%, or 3%, as non-limiting examples. Like the setting of the THD threshold, the target THD will be set according to the application of ASD 14 and/or the location in which the application will be performed.

In order to counter the harmonics in line current, $i_L$, controller 92 monitors a level of harmonics in line current, $i_L$, at any given moment and injects the opposite or reverse of those harmonics back into line current, $i_L$, via I/O 60 of housing 58 (FIG. 1) using inverter 72. The injection of the reverse harmonics cancels out the harmonics in line current, $i_L$. Controller 92 monitors line current, $i_L$, and determines the appropriate current to inject into line current, $i_L$, based on measurements taken by supply voltage sensor 96, filter current sensor 98, and line current sensor 102. Controller 92 may monitor and cancel out the harmonics in line current, $i_L$, up to a specific harmonic such as, for example, the $50^{th}$ harmonic. In doing so, controller 92 lowers the THD in source current, $i_S$, and may provide additional benefits such as power factor correction, as a non-limiting example. Furthermore, controller 92 may activate EMI filter 104 to counteract the switching frequency of inverter 52 of ASD 14 and/or inverter 72 of AHF and REC apparatus 16.

Referring to FIG. 3, motor 56 is producing regenerating energy in equivalent circuit 118. The regenerating energy produced by motor 56 causes DC link voltage, $v_{dc}$, to increase. Once DC link voltage, vac, is higher than DC link voltage, $v_D$, current begins to flow from ASD 14 to AHF and REC apparatus 16. More specifically, when ASD 14 is experiencing a regenerating energy condition, current flows from DC link 40 to DC link 83 through ASD output 46 of housing 28 (FIG. 1), I/O 62 of housing 58, and diode 86. Since rectifier 36 does not operate in the reverse direction (that is, rectifier 36 cannot convert DC link voltage, $v_{dc}$, into an AC voltage), current no longer flows through rectifier 36 to line reactor 32. Since rectifier 36 is not conducting during a regenerating condition, equivalent circuit 118 of FIG. 3 does not include line reactor 32 or rectifier 36.

Controller 92 may use one or more methods to determine if ASD 14 is experiencing a regenerating condition. Controller 92 monitors DC link voltage, $v_{dc}$, using first DC link voltage sensor 100 to determine if DC link voltage, vac, has reached or crossed a first regenerating voltage threshold. Controller 92 may also monitor DC link voltage, VD, using DC link voltage sensor 103 to determine if DC link voltage, VD, has reached or crossed a second regenerating energy threshold. Further, controller 92 may compare DC link voltage, $v_{dc}$, to DC link voltage, VD, using first and second DC link voltage sensors 100, 103 to determine if a difference between DC link voltage, $v_{dc}$, and DC link voltage, $v_D$, is equal to or greater than a DC link voltage difference threshold.

Since ASD 14 is directing regenerating energy from motor 56 to AHF and REC apparatus 16, controller 92 operates inverter 72 in REC mode. Controller 92 detects that ASD 14 is in a regenerating condition using first DC link voltage sensor 100 and/or second DC link voltage sensor 103 (FIG. 1). When first DC link voltage sensor 100 senses a DC link voltage, $v_{dc}$, at or above the first regenerating voltage threshold, second DC link voltage sensor 103 senses a DC link voltage, $v_D$, at or above the second regenerating voltage threshold, or when a difference between DC link voltage, $v_{dc}$, and DC link voltage, $v_D$, sensed by first and second DC link voltage sensors 100, 103 is greater than the DC link voltage difference threshold, controller 92 switches into REC mode. When in REC mode, controller 92 operates inverter 72 to direct power back to power supply 12 such that the regenerating energy is not wasted. Controller 92 directs power back to power source 12 at supply voltage, $v_S$, as measured by supply voltage sensor 96. In other words, controller 92 controls inverter 72 such that the voltage output at first end 66 of filter reactor 64 is equal to that of supply voltage, $v_S$.

In addition, controller 92 may optionally couple EMI filter 104 to node 112 in REC mode by switching relays 114 into the ON state. However, since controller 92 has control over the output to power source 12 via inverter 72, it is not usually necessary to connect EMI filter to node 112 in REC mode. Thus, in some embodiments, controller 92 may be configured not to switch relays 114 to the ON state whenever controller 92 is operating inverter 72 in REC mode.

Referring to FIG. 4, power source 12 is supplying power to ASD 14 to drive motor 56 in equivalent circuit 120 in a similar manner to that shown in FIG. 2. Since motor 56 is not producing regenerating energy, ASD 14 is operating normally, and diode 86 of AHF and REC apparatus 16 is blocking current from flowing between DC link 40 of ASD 14 and DC link 83 of AHF and REC apparatus 16. Hence, diode 86 is preventing a connection from being made between DC link 40 and DC link 83. However, unlike FIG. 2, FIG. 4 illustrates a case in which the THD in line current, $i_L$, is not at or above the THD threshold. Therefore, controller 92 has no need to operate inverter 72 in either AHF mode or REC mode. Accordingly, controller 92 controls inverter in the OFF state and no current will flow from power source 12 into first end 66 of filter reactor 64 (FIG. 1). Since no current is flowing into filter reactor 64 or diode 86, equivalent circuit 120 of FIG. 4 does not include any components of AHF and REC circuit 16 electrically connected between node 112 (FIG. 1) and DC link 40 of ASD 14. More specifically, filter reactor 64, inverter 72, capacitor bank 84, and diode 86 are not shown in FIG. 4.

Controller 92 continues to monitor sensors 96, 98, 100, 102, 103 while controlling inverter 72 in the OFF state to monitor the status of the various measured voltages and currents. As non-limiting example, controller 92 may continuously determine if the THD at ASD input 30 of ASD 14 rises to or above the THD threshold and if DC link voltage, $v_{dc}$, rises to or above the regenerating voltage threshold. Controller 92 may also determine whether to activate optional EMI filter 104. Inverter 52 of ASD 14 will still be operating while inverter 72 is in the OFF state. Thus, EMI filter 104 may be needed to reduce switching noise produced by inverter 52.

While controller 92 typically controls inverter 72 in the OFF state when neither AHF mode nor REC node is needed, controller 92 may also be configured to keep inverter 72 in the OFF state instead of operating inverter in AHF mode. As a non-limiting example, if ASD 14 is used in an application does not require reduction of the THD caused by rectifier 36, controller 92 can be configured never to operate inverter 72 in AHF mode. In that case, controller 92 will operate inverter 72 in REC mode when DC link voltage, $v_{dc}$, is at or above the regenerating voltage threshold and will maintain inverter 72 in the OFF state otherwise. As such, the configuration of controller 92 is highly adaptably to the application of ASD 14.

Figure 5:
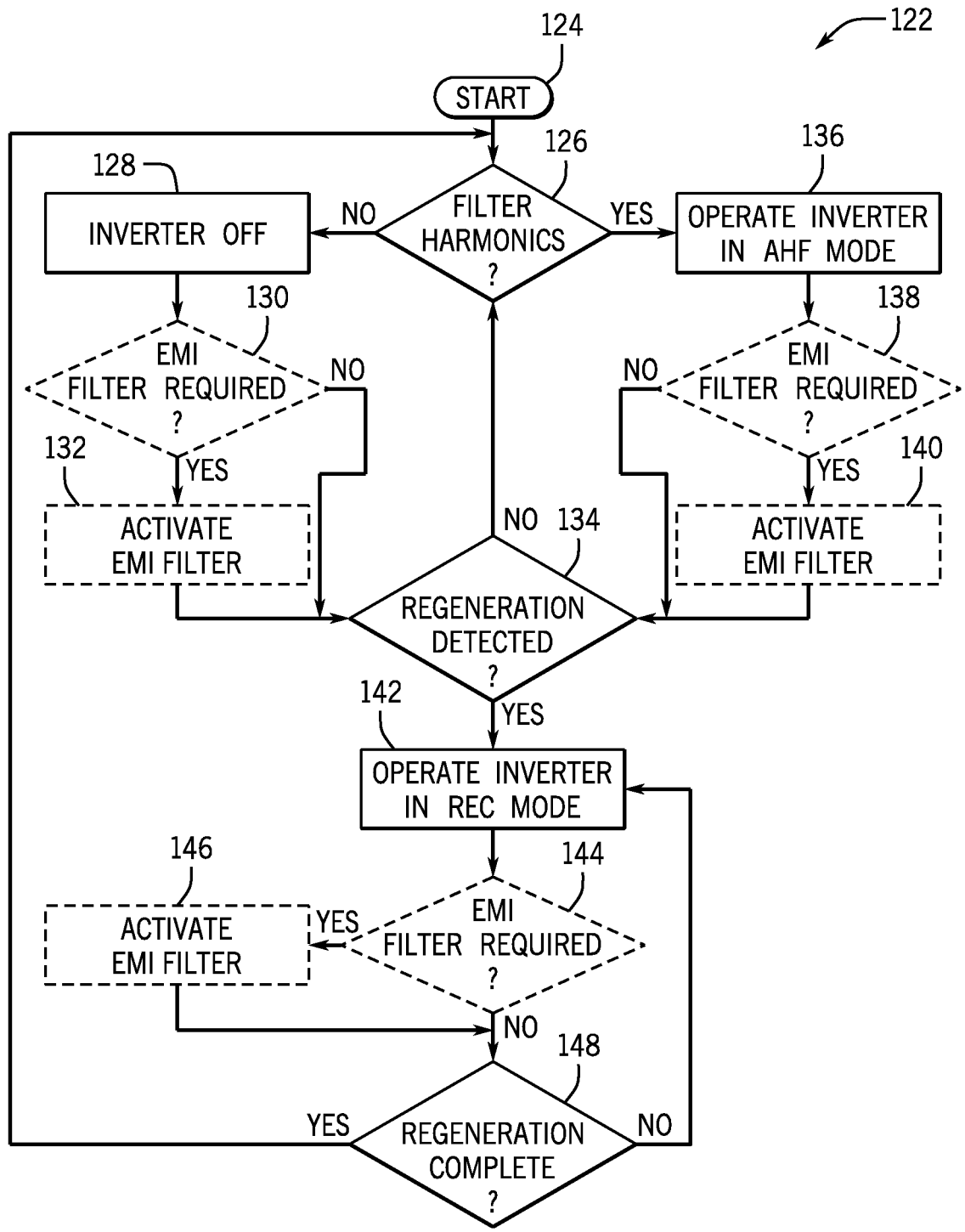
FIG. 5 is a flowchart illustrating a technique for controlling the AHF and REC apparatus of FIG. 1 according to an embodiment of the invention.

Referring now to FIG. 5, and with reference back to FIG. 1, a technique 122 for controlling AHF and REC apparatus 16 of electrical system 10 is shown, with the technique being performed by a controller in or associated with AHF and REC apparatus 16, such as controller 92, according to an exemplary embodiment. Process 140 starts at STEP 124 when power is input into ASD 14 from power source 12—such as at startup of ASD 14. At STEP 126, controller 96 determines whether harmonics present in line current, $i_L$, need to be filtered. If the THD at ASD input 30 of ASD 14 is less than the THD threshold, controller 92 proceeds to STEP 128, where controller maintains inverter 72 in the OFF state.

In embodiments that include EMI filter 104, controller 92 proceeds to optional STEPS 130, 132. Otherwise, controller 92 proceeds directly to STEP 134. At STEP 130, controller determines whether to activate EMI filter 104. If the switching frequency of inverter 52 or inverter 72 is at or above the switching frequency threshold, controller 92 proceeds to STEP 132 and switches relays 114 from the OFF state to the ON state to connect EMI filter 104 to node 112. If the switching frequencies of inverter 52 and inverter 72 are below the switching frequency threshold, controller 92 proceeds to STEP 134 and determines whether ASD 14 is experiencing a regenerating energy condition. If DC link voltage, $v_{dc}$, is less than the first regenerating voltage threshold, DC link voltage, $v_D$, is less than the second regenerating voltage threshold, or if a difference between DC link voltage, $v_{dc}$, and DC link voltage, $v_D$, is less than the DC link voltage difference threshold, controller 92 proceeds back to STEP 126.

Referring again to STEP 126, if controller 92 determines that the THD at ASD input 30 is at or above the THD threshold, controller 92 proceeds to STEP 136 and operates inverter 72 in AHF mode. In embodiments that include EMI filter 104, controller 92 proceeds to optional STEPS 138, 140. Otherwise, controller 92 proceeds directly to STEP 134. At STEP 138, controller determines whether to activate EMI filter 104. If the switching frequency of inverter 52 or inverter 72 is at or above the switching frequency threshold, controller 92 proceeds to STEP 140 and switches relays 114 from the OFF state to the ON state to connect EMI filter 104 to node 112. If the switching frequencies of inverter 52 and inverter 72 are below the switching frequency threshold, controller 92 proceeds to STEP 134 and determines whether ASD 14 is experiencing a regenerating energy condition. If DC link voltage, $v_{dc}$, is less than the first regenerating voltage threshold, DC link voltage, $v_D$, is less than the second regenerating voltage threshold, or if a difference between DC link voltage, $v_{dc}$, and DC link voltage, VD, is less than the DC link voltage difference threshold, controller 92 proceeds back to STEP 126.

Referring again to STEP 134, if DC link voltage, $v_{dc}$, is equal to or greater than the first regenerating voltage threshold, DC link voltage, $v_D$, is equal to or greater than the second regenerating voltage threshold, or if a difference between DC link voltage, $v_{dc}$, and DC link voltage, $v_D$, is equal to or greater than the DC link voltage difference threshold, controller 92 proceeds to STEP 142 and operates inverter 72 in REC mode. In embodiments that include EMI filter 104, controller 92 proceeds to optional STEPS 144, 146. Otherwise, controller 92 proceeds directly to STEP 148. At STEP 144, controller determines whether to activate EMI filter 104. If the switching frequency of inverter 52 or inverter 72 is at or above the switching frequency threshold, controller 92 proceeds to STEP 146 and switches relays 114 from the OFF state to the ON state to connect EMI filter 104 to node 112. If the switching frequencies of inverter 52 and inverter 72 are below the switching frequency threshold, controller 92 proceeds to STEP 148 and determines whether ASD 14 is still experiencing a regenerating energy condition. If DC link voltage, $v_{dc}$, is still equal to or greater than the regenerating voltage threshold, controller 92 continues to operate inverter 72 in REC mode at STEP 142. If DC link voltage, $v_{dc}$, is less than the regenerating voltage threshold, controller 92 proceeds back to STEP 126.

Controller 92 will continue to follow process 122 of FIG. 5 until ASD 14 is shut down. In this manner, the THD in electrical system 10 will be improved and regenerating energy produced by motor 56 will be appropriately controlled back to power source 12 according to the configuration of controller 92. However, as explained above, process 122 may be modified according to the specific needs of the application for which ASD 14 is being used. As a non-limiting example, in situations where THD is not a concern or a requirement in a particular application or location, controller 92 may be configured not to perform STEPS 126, 136, 138, 140 of process 122, and controller 92 will instead proceed directly to STEP 128 from STEPS 124, 134. In other words, controller 92 will not determine whether to filter harmonics present in line current, IL, and will maintain inverter 72 in the OFF state unless controller 92 detects regenerating energy on DC link 40.

Beneficially, embodiments of the invention thus provide an AHF and REC apparatus having the capability to both filter harmonics input into an ASD and to control regenerating energy produced by a motor coupled to the ASD. The AHF and REC apparatus includes an inverter and a controller operating the inverter according to measurements taken by a plurality of voltage and current sensors. When a THD in an input to the ASD is at or above a predefined THD threshold, the controller operates the inverter in an AHF mode to reduce the THD below the THD threshold. When a DC link voltage in the ASD is at or above a first regenerating voltage threshold, a DC link voltage in the AHF and REC apparatus is at or above a second regenerating voltage threshold, or if a difference between the DC link voltage of the ASD and the DC link voltage of the AHF and REC apparatus is greater than a DC link voltage difference threshold, the controller operates the inverter in an REC mode to control regenerating energy output by the ASD and direct the regenerating energy back to a power source powering the ASD. The AHF and REC apparatus may also include an EMI filter to reduce switching noise in some embodiments. The AHF and REC apparatus provides a compact and cost-effective solution for filtering harmonics and controlling regenerating energy in an ASD and may be coupled to an ASD as a retrofit drive. In fact, the AHF and REC apparatus may provide a solution with hardware that is half the size of previous solutions requiring separate drives for harmonic filtering and controlling regenerating energy.

According to one embodiment of the present invention, an AHF and REC apparatus for an ASD includes an inverter and a control system operatively coupled to the inverter to selectively control operation thereof. The control system is programmed to operate the inverter in an AHF mode in order to filter harmonics present at an input to an ASD and operate the inverter in an REC mode in order to control regenerating energy flowing into the inverter from the ASD.

According to another embodiment of the present invention, a method of operating an AHF and REC apparatus couplable to an ASD and having a controller is performed by the controller. The method includes monitoring harmonics at an input to the ASD, operating the AHF and REC apparatus in an AHF mode to filter the harmonics, determining that regenerating energy is flowing from the ASD into the AHF and REC apparatus, and switching operation of the AHF and REC apparatus from the AHF mode to an REC mode to manage the regenerating energy.

According to yet another embodiment of the present invention, a retrofit drive with AHF and REC for an ASD includes a drive input/output capable of receiving a power input and discharging a power output and a filter reactor having one or more inductors coupled to the drive input/output. The retrofit drive also includes an inverter having an AC side coupled to the drive input/output via the reactor and a DC side. The retrofit drive additionally includes a capacitor bank having one or more capacitors coupled to the DC side of the inverter and a diode having a cathode coupled to the capacitor bank and an anode. The retrofit drive further includes a drive input coupled to the anode of the diode and capable of receiving regenerating energy. In addition, the retrofit drive includes a controller configured to operate the inverter in an AHF mode to filter harmonics present at an input to the ASD, operate the inverter in an REC mode to regulate regenerating energy flowing into the drive input and into the anode of the diode, and deactivate the inverter if the drive input is not receiving regenerating energy and a characteristic of the harmonics present at the drive input/output is below a preset threshold.

The present invention has been described in terms of the preferred embodiment, and it is recognized that equivalents, alternatives, and modifications, aside from those expressly stated, are possible and within the scope of the appending claims.

What is claimed is:

1. An active harmonic filter (AHF) and regenerating energy control (REC) apparatus for an adjustable speed drive (ASD), the AHF and REC apparatus comprising:
   an inverter; and
   a control system operatively coupled to the inverter to selectively control operation thereof, the control system programmed to:
   operate the inverter in an AHF mode in order to filter harmonics present at an input to an ASD;
   operate the inverter in an REC mode in order to control regenerating energy flowing into the inverter from the ASD; and
   operate the inverter in an OFF state when a characteristic of the harmonics is below a threshold and a DC link voltage of the ASD is below a regenerating energy threshold.

2. The AHF and REC apparatus of claim 1 wherein the characteristic of the harmonics is a total harmonic distortion (THD) caused by the harmonics.

3. The AHF and REC apparatus of claim 1 further comprising:
   a reactor comprising one or more inductors, the reactor having a first end and a second end coupled to an alternating current (AC) side of the inverter;
   a capacitor bank comprising one or more capacitors coupled to a direct current (DC) side of the inverter; and
   a diode having a first end coupled to the capacitor bank and the DC side of the inverter.

4. The AHF and REC apparatus of claim 3 further comprising a plurality of sensors including:
   a first sensor configured to measure a voltage at the first end of the reactor;
   a second sensor configured to measure a filter current flowing between the second end of the reactor and the AC side of the inverter;
   a third sensor configured to measure a line current flowing into the ASD;
   a fourth sensor configured to measure a DC link voltage in the ASD; and
   a fifth sensor configured to measure a voltage across the capacitor bank;
   wherein the control system is programmed to operate the inverter in the AHF mode and the REC mode based on the voltages and currents measured by the first, second, third, fourth, and fifth sensors.

5. The AHF and REC apparatus of claim 3 wherein the first end of the diode comprises a cathode and the second end of the diode comprises an anode.

6. The AHF and REC apparatus of claim 3 wherein the AHF and REC apparatus further comprises a housing and is couplable to the ASD as a retrofit drive.

7. The AHF and REC apparatus of claim 6 wherein the reactor is positioned outside the housing and the inverter, capacitor bank, diode, and control system are positioned inside the housing.

8. The AHF and REC apparatus of claim 3 further comprising:
   an electromagnetic interference (EMI) filter coupled to the first end of the reactor; and
   at least one relay positioned between the EMI filter and the first end of the reactor;
   wherein the control system is programmed to operate the at least one relay in an ON state and an OFF state to selectively couple the EMI filter to the first end of the reactor.

9. The AHF and REC apparatus of claim 8 wherein the control system is programmed to operate the at least one relay in the ON state if a switching frequency of an inverter of the ASD is at or above a predetermined threshold.

10. The AHF and REC apparatus of claim 1 wherein the control system is programmed to operate the inverter in the REC mode when a voltage on a DC link of the ASD is equal to or greater than a regenerating voltage threshold.

11. A method of operating an active harmonic filter (AHF) and regenerating energy control (REC) apparatus couplable to an adjustable speed drive (ASD) and having a controller, the method being performed by the controller and comprising:
    monitoring harmonics at an input to the ASD;
    operating the AHF and REC apparatus in an AHF mode to filter the harmonics;
    determining that regenerating energy is flowing from the ASD into the AHF and REC apparatus by:
    measuring a voltage on a DC link of the ASD; and
    determining that the DC link voltage is equal to or greater than a regenerating voltage threshold; and
    switching operation of the AHF and REC apparatus from the AHF mode to an REC mode to manage the regenerating energy.

12. The method of claim 11 further comprising:
    determining that regenerating energy has stopped flowing into the AHF and REC apparatus; and
    switching operation of the AHF and REC apparatus from the REC mode to one of the AHF mode and a non-operational mode upon determining that regenerating energy has stopped flowing into the AHF and REC apparatus, the AHF and REC apparatus being switched to the AHF mode if a total harmonic distortion (THD) associated with the monitored harmonics is above a predetermined THD threshold and being switched to the non-operational mode if the THD associated with the monitored harmonics is below the predetermined THD threshold.

13. The method of claim 11 wherein the AHF and REC apparatus comprises a reactor, a capacitor bank, an inverter having an alternating current (AC) side coupled to the reactor and a direct current (DC) side coupled to the capacitor bank, and a diode coupled to the capacitor bank and the DC side of the inverter; and
    wherein, in operating the AHF and REC apparatus in the AHF mode and the REC mode, the method further comprises selectively operating the inverter to filter the harmonics or to manage the regenerating energy.

14. The method of claim 11 further comprising selectively activating an electromagnetic interference (EMI) filter of the AHF and REC apparatus via a set of relays.

15. The method of claim 14 wherein selectively activating the EMI filter of the AHF and REC apparatus via the set of relays comprises switching the set of relays to an ON state if a switching frequency of an inverter of the ASD is at or above a predetermined threshold.

16. A retrofit drive with active harmonic filtering (AHF) and regenerating energy control (REC) for an adjustable speed drive (ASD), the retrofit drive comprising:
- a drive input/output capable of receiving a power input and discharging a power output;
- a filter reactor comprising one or more inductors coupled to the drive input/output;
- an inverter having an alternating current (AC) side coupled to the drive input/output via the reactor and a direct current (DC) side;
- a capacitor bank comprising one or more capacitors coupled to the DC side of the inverter;
- a diode having a cathode coupled to the capacitor bank and an anode;
- a drive input coupled to the anode of the diode and capable of receiving regenerating energy; and
- a controller configured to:
  - operate the inverter in an AHF mode to filter harmonics present at an input to the ASD;
  - operate the inverter in an REC mode to regulate regenerating energy flowing into the drive input and into the anode of the diode; and
  - deactivate the inverter if the drive input is not receiving regenerating energy and a characteristic of the harmonics present at the drive input/output is below a preset threshold.

17. The retrofit drive of claim 16 further comprising an electromagnetic interference (EMI) filter selectively coupled to a node between the drive input/output and the reactor via at least one relay operable by the controller in a closed state and an open state.

18. The retrofit drive of claim 17 wherein the controller is configured to operate the at least one relay in the open state unless a switching frequency of an ASD inverter rises above a preset threshold.

19. The retrofit drive of claim 16 wherein the controller is further configured to detect that regenerating energy flowing into the drive input when a voltage on a DC link coupled to the DC side of the inverter rises above a preset threshold.

20. The retrofit drive of claim 16 wherein the characteristic of the harmonics present at the drive input/output is a total harmonic distortion (THD) caused by the harmonics.

* * * * *